United States Patent Office 3,269,494
Patented August 30, 1966

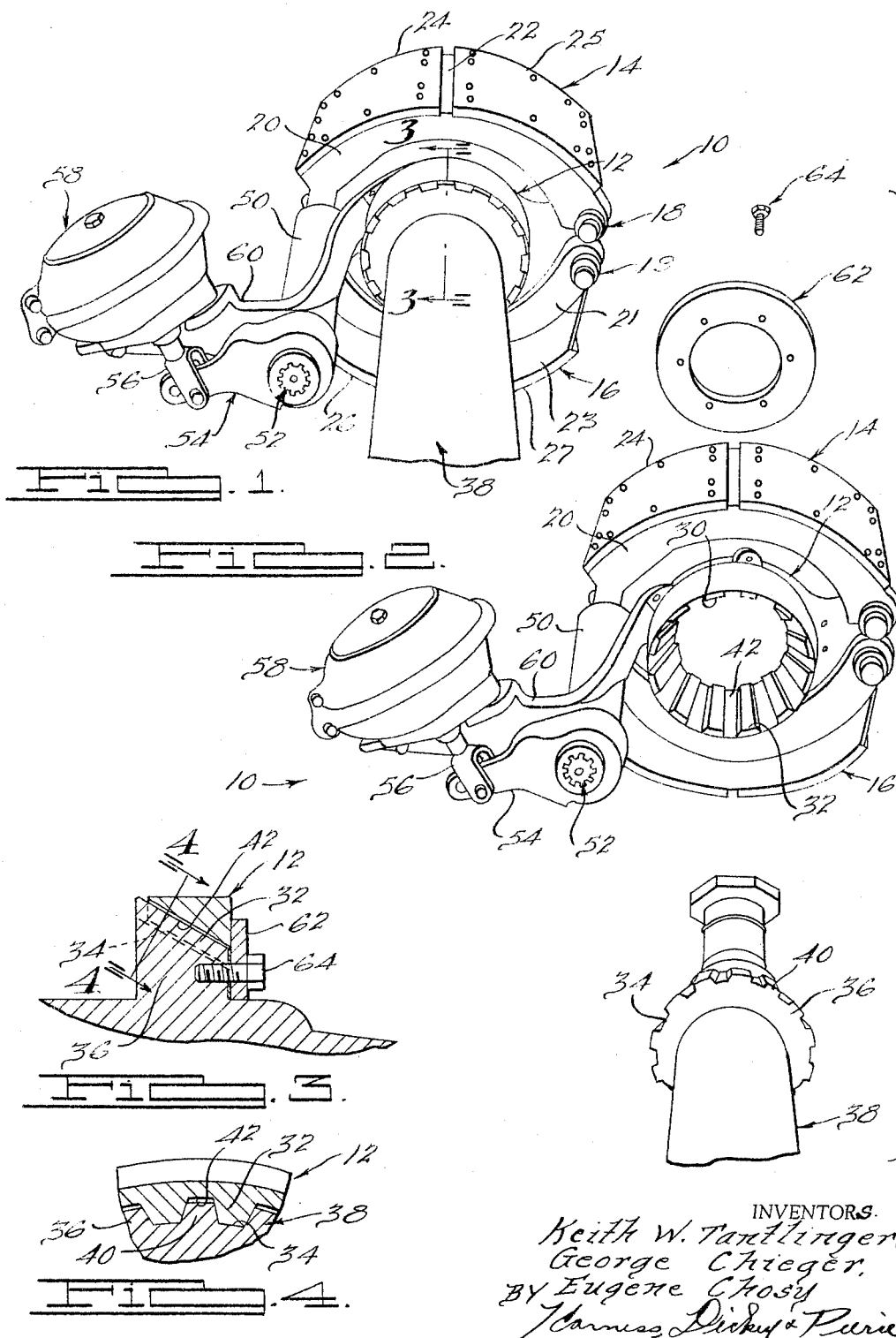

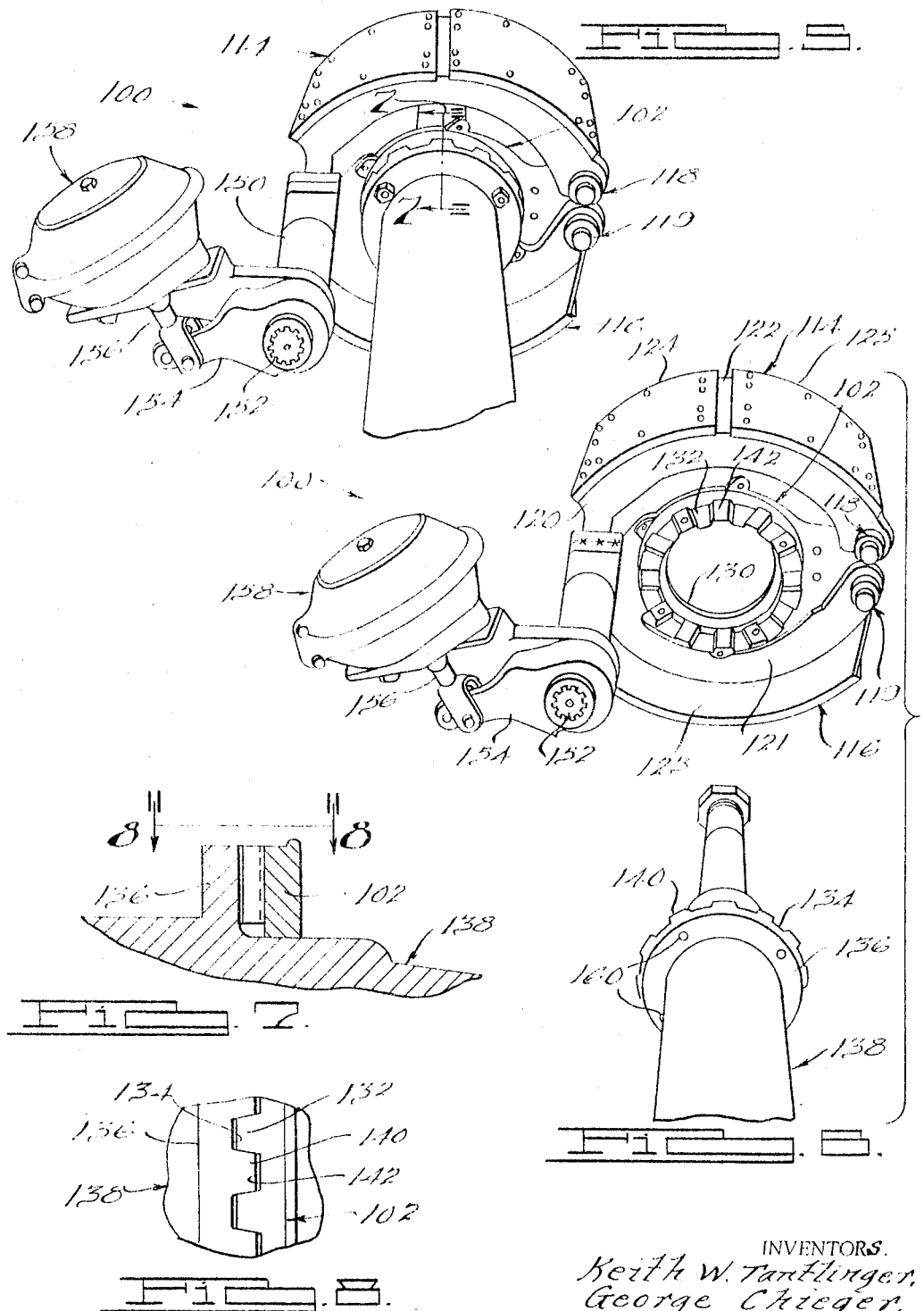

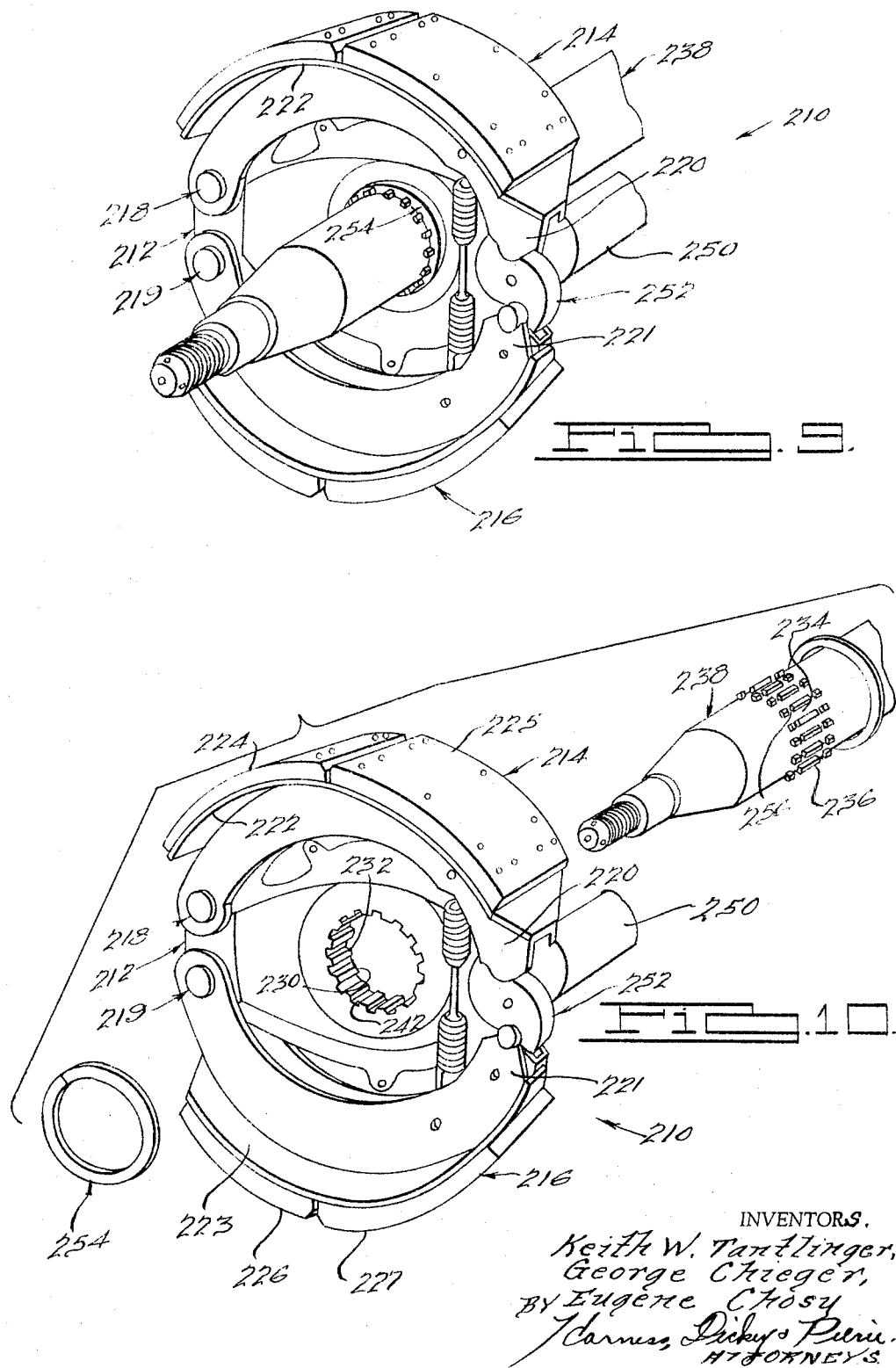

3,269,494
BRAKE MOUNTING PLATE
Keith W. Tantlinger, Grosse Pointe Shores, George Chieger, Birmingham, and Eugene Chosy, Grosse Pointe Farms, Mich., assignors to Fruehauf Corporation, Detroit, Mich., a corporation of Michigan
Filed Aug. 25, 1964, Ser. No. 391,981
2 Claims. (Cl. 188—206)

This invention relates generally to brake constructions and more particularly to a quick disconnect brake assembly.

Rapidly rising labor costs have put increasing emphasis on the speed of assembly and disassembly of vehicle components both in original construction and to effect maintenance thereof. The purchaser of, for example, a heavy duty over-the-road vehicle is particularly interested in the cost of maintaining and replacing items subject to severe wear, for example, the vehicle brakes.

Brake repairs or replacement is most efficiently carried out by removing the brakes from the vehicle as a sub-assembly as opposed to repairing the brakes on the vehicle. Accordingly, one object of the instant invention is a brake unit that is a complete subassembly capable of rapid attachment to and detachment from a vehicle axle.

It is desirable that the brake assembly of a heavy duty over-the-road vehicle be attachable to the axle thereof in a manner that permits it to be indexed to a selected one of a number of angularly displaced positions so that the actuating cylinder thereof can be positioned to clear adjacent elements, for example, radius rods, shock absorbers, etc. which may be repositioned or added to the vehicle as dictated by operational conditions or field usage of the vehicle.

Thus, another object of the instant invention is a brake assembly that can be secured to a vehicle axle at any one of a number of angular positions.

Other objects and advantages of the instant invention will be apparent in the following specification, claims and drawings wherein:

FIGURE 1 is a perspective view of an improved brake in accordance with one embodiment of the instant invention;

FIG. 2 is an exploded perspective view of the brake of FIG. 1;

FIG. 3 is a cross sectional view taken substantially along the line 3—3 of FIG. 1;

FIG. 4 is a cross sectional view taken substantially along the line 4—4 of FIG. 3;

FIG. 5 is a perspective view, similar to FIG. 1, of a modified brake;

FIG. 6 is a perspective view, in exploded form, of the brake of FIG. 5;

FIG. 7 is a cross sectional view taken substantially along the line 7—7 of FIG. 5;

FIG. 8 is a view taken substantially along the line 8—8 of FIG. 7;

FIG. 9 is a perspective view of yet another embodiment of the instant invention; and FIG. 10 is an exploded perspective view of the brake of FIG. 9.

Referring to FIG. 1 of the drawings, an improved brake construction 10, in accordance with an exemplary constructed embodiment of the instant invention, comprises a mounting plate 12 to which a pair of brake shoes 14 and 16 are pivotally secured as by a pair of pivot pins 18 and 19, respectively. The shoes 14 and 16 are conventional in construction comprising web portions 20 and 21, flange portions 22 and 23, and lining portions 24–25 and 26–27, respectively.

The mounting plate 12 has a central aperture 30 (FIG. 2) with a plurality of circumferentially spaced axially convergent splines 32 spaced thereabout. As best seen in FIG. 3 the splines 32 on the mounting plate 12 are engageable in complementary groves 34 on a flange 36 of an axle 38. The flange 36 on the axle 38 has a plurality of splines 40 that are engageable in complementary grooves 42 in the mounting plate 12. From the foregoing description, it should be apparent that the mounting plate 12 is positionable at relatively small angularly spaced increments circumferentially of the flange 36 on the axle 38, the actual increment being dictated by the spacing of the splines and grooves on the respective members. In this manner the brake 10 can be positioned relative to the axle 38 to effect clearance of other components of the vehicle running gear, for example, springs, shock absorbers, wheel lift mechanisms, etc.

In accordance with another feature of the instant invention a tubular brake actuator shaft bearing 50 is formed integrally with the mounting plate 12 for journaling of a brake actuator shaft 52. The shaft 52 is actuated through a lever arm 54 by the piston 56 of a conventional air cylinder 58. It is to be noted that the air cylinder 58 is supported on arm 60 of the mounting plate 12. Removal of the mounting plate 12 from the axle 38 thus effects removal of the brake shoes 14 and 16 as well as the cylinder 58 and requires only that an air line (not shown) leading to the air cylinder 58 be disconnected, and a retaining ring 62 be removed from the axle 36. The retaining ring 62 is held in place by a plurality of machine screws 64.

Referring to FIGS. 5–8 of the drawings, a modified brake construction 100 comprises a mounting plate 102 upon which a pair of brake shoes 114 and 116 are mounted as by a pair of pivot pins 118 and 119, respectively. The shoes 114 and 116 are conventional in construction comprising web portions 120 and 121, flange portions 122 and 123, and lining portions 124–125 and 126–127, respectively.

The mounting plate 102 has a central aperture 130 (FIG. 6) with a plurality of circumferentially spaced radially extending splines 132 on the inner face thereof. The splines 132 on the mounting plate 102 are engageable in complementary grooves 134 on a flange 136 on an axle 138. The flange 136 on the axle 138 has a plurality of splines 140 that are engageable in complementary grooves 142 in the mounting plate 102. From the foregoing description, it should be apparent that the mounting plate 102 is positionable at relatively small angularly spaced increments circumferentially of the flange 136 on the axle 138, the actual increment being dictated by the spacing of the splines and grooves on the respective members. In this manner the brake 100 can be positioned relative to the axle 138 to effect clearance of other components of the vehicle running gear, for example, springs, shock absorbers, wheel lift mechanisms, etc.

In accordance with another feature of the instant invention a tubular brake actuator shaft bearing 150 is formed integrally with the mounting plate 102 for journaling of a brake actuator shaft 152. The shaft 152 is actuated through a lever arm 154 by the piston 156 of a conventional air cylinder 158. Removal of the mounting plate 102 from the axle 138 thus effects removal of the cylinder 158 and requires only that an air line (not shown) leading to the air cylinder 158 be disconnected, and that a plurality of machine screws 160, which secure the mounting plate 102 to the flange 136 of the axle 138, be removed.

Referring to FIGS. 9 and 10 of the drawings, an improved brake construction 210, in accordance with another embodiment of the instant invention, comprises a mounting plate 212 upon which a pair of brake shoes 214 and 216 are mounted as by a pair of pivot pins 218 and 219, respectively. The shoes 214 and 216 are conventional in construction comprising web portions 220 and 221, flange portions 222 and 223, and lining portions 224–225 and 226–227, respectively.

The mounting plate 212 has a central aperture 230 (FIG. 10) with a plurality of circumferentially spaced axially extending splines 232 spaced thereabout. As best seen in FIG. 10 the splines 232 on the mounting plate 212 are engageable in complementary spaces 234 between complementary splines 236 on an axle 238. The splines 236 are engageable in complementary grooves 242 in the mounting plate 212. Thus, it should be apparent that the mounting plate 212 is positionable at relatively small angularly spaced increments circumferentially of the axle 238, the actual increment being dictated by the spacing of the splines and grooves on the respective members. In this manner the brake 210 can be positioned relative to the axle 238 to effect clearance of other components of the vehicle running gear, for example, springs, shock absorbers, wheel lift mechanisms, etc.

The brake assembly 210 is provided with a tubular brake actuator shaft bearing 250 for journaling of a brake actuator shaft having a shoe actuating cam 252. The shaft and cam 252 is actuated through a lever arm by the piston of a conventional air cylinder as discussed hereinbefore. Thus, removal of the mounting plate 212 from the axle 238 effects removal of the entire brake assembly 210.

Removal of the brake assembly 210 requires only that an air line leading to the air cylinder (not shown) be disconnected, and that a split retaining ring 254 be removed from a circumferential slot 256 in the splines 236 of the axle 238.

From the foregoing description, it should be apparent that the several embodiments of the brake assembly of the instant invention have a number of features in common. Each comprises a mounting plate that is securable to an axle by a spline connection. The spline connection not only transmits torque between the axle and the mounting plate but provides for incremental adjustment of the mounting plate circumferentially of the axle to position the brake assembly at any desired angular position relative to the axle. The mounting plate provides a support for a fluid actuator which effects radial movement of a pair of brake shoes through an actuating shaft. The actuating shaft is supported in a bearing that is also carried by the mounting plate. Thus, disengagement of the spline connection between the mounting plate and the axle, as by removal of suitable machine screws or a locking ring, permits removal of the entire brake assembly from the axle.

It is to be understood that the specific construction of the improved brake construction herein disclosed and described is presented for the purpose of explanation and illustration and is not intended to indicate limits of the invention, the scope of which is defined by the following claims.

What is claimed is:
1. A removable brake assembly for a heavy duty over-the-road vehicle having an axle, said brake assembly comprising
 a mounting plate having a circular aperture therein,
 a plurality of splines on said plate spaced circumferentially of the aperture therein,
 a plurality of grooves on an axle of the vehicle complementary to the splines on said mounting plate,
 said mounting plate being positionable relative to said axle in circumferentially spaced increments dictated by the spacing of said splines,
 a brake actuating shaft bearing supported by said plate,
 a brake actuating shaft in said bearing,
 a fluid actuator supported by said mounting plate,
 means for connecting the cylinder of said actuator with said actuator shaft, and
 a pair of brake shoes pivotally supported by said mounting plate and movable by said actuating shaft.

2. A removable brake assembly for a heavy duty over-the-road vehicle having a transverse axle, said brake assembly comprising
 a mounting plate at one end of the axle having a circular aperture therein,
 a plurality of circumferentially spaced splines at the periphery of the aperture in said plate,
 a plurality of grooves on an axle of the vehicle complementary to the splines on said mounting plate,
 said mounting plate being positionable relative to said axle in circumferentially spaced increments dictated by the spacing of said splines,
 a brake actuating shaft bearing supported by said plate and extending generally parallel to the central axis of the vehicle axle,
 a brake actuating shaft in said bearing,
 a fluid actuator supported by said mounting plate,
 means for connecting the cylinder of said actuator with said actuator shaft, and
 a pair of brake shoes pivotally supported by said mounting plate and movable by said actuating shaft.

References Cited by the Examiner

UNITED STATES PATENTS

| | | | |
|---|---|---|---|
| 1,810,356 | 6/1931 | Leipert | 188—206 |
| 2,258,888 | 10/1941 | Frank | 188—206 X |
| 2,381,737 | 8/1945 | Goepfrick et al. | 188—206 X |

DUANE A. REGER, *Primary Examiner.*